Patented Jan. 1, 1946

2,392,137

UNITED STATES PATENT OFFICE 2,392,137

SEPARATION AND PURIFICATION OF ISOMERIC DIHYDROXY DIPHENYL SULPHONES

Scott H. Foster, Waban, Mass., assignor to Monsanto Chemical Company, St. Louis, Mo., a corporation of Delaware No Drawing. Application December 30, 1944,
Serial No. 570,798

9 Claims. (Cl. 260—607)

The present invention relates to methods of separating and purifying mixtures of isomeric dihydroxy diphenyl sulphones, and particularly relates to methods of separating the isomeric sulphones contained in mixtures consisting primarily of p,p' dihydroxy diphenyl sulphone and o,p' dihydroxy diphenyl sulphone.

When phenol and an $SO_3$ containing acid such as sulphuric acid or oleum are heated together at an elevated temperature, mixtures of dihydroxy diphenyl sulphones are obtained usually containing a major proportion of p,p' dihydroxy diphenyl sulphone and a minor amount of o,p' dihydroxy diphenyl sulphone. These mixtures have been separated into their isomeric constituents by fractional crystallization, but such methods of separation are very slow and cumbersome and have not been at all practical for commercial operations.

It is accordingly a primary object of the present invention to provide methods of separating mixtures of isomeric sulphones such as those described above into their isomeric constituents, which are relatively simple and efficient and admirably adapted for large scale operations.

A further object of the invention is to provide methods not only of separating mixtures of the type described into their isomeric constituents, but of purifying certain of the separated isomers.

Still further objects and advantages of the invention will appear from the following description and appended claims. Before explaining in detail the present invention, however, it is to be understood that the invention is not limited to the details described herein, since the invention is capable of other embodiments and of being practiced or carried out in various ways.

The invention is primarily concerned with the separation of isomers from mixtures containing a major proportion of p,p' dihydroxy diphenyl sulphone and 30% or less of o,p' dihydroxy diphenyl sulphone. However, the invention is also of value in the separation of isomers from mixtures containing more than 30% o,p' dihydroxy diphenyl sulphone. Fundamentally, the invention involves the formation of calcium complexes of the various sulphones contained in the mixtures to be separated, which complexes differ from each other in solubility in water to such an extent that a separation of one from the other can be effected. Referring first to those mixtures containing 30% or less of the o,p' dihydroxy diphenyl sulphone, separation may be accomplished by mixing the isomeric mixture with from 30 to 50% of an equimolar amount of calcium oxide or hydroxide, and simultaneously or subsequently dissolving the resulting mixture in an amount of water sufficient to provide a solution containing from 10 to 30% sulphones while heating at a temperature varying from 50 to 100° C., and then cooling the resulting solution until a precipitate of a calcium complex of p,p' dihydroxy diphenyl sulphone is formed. This precipitate is separated from the solution, as for example by filtering, centrifuging, or the like, after which it is converted to p,p' dihydroxy diphenyl sulphone by forming a slurry with water and acidifying the slurry with an acid capable of forming a water soluble calcium salt, such as hydrochloric acid, hydrobromic acid, hydriodic acid, acetic acid, benzene sulphonic acid, phenol sulphonic acid and the like. The p,p' dihydroxy diphenyl sulphone is then separated from the slurry in any desired manner, as by filtering.

The filtrate or solution remaining after the separation of the above calcium complex contains about half of the p,p' dihydroxy diphenyl sulphone originally present in the mixture and substantially all of the o,p' dihydroxy diphenyl sulphone, and in some instances a small amount of resinous material of unknown constitution. Since this mixture contains a relatively larger amount of o,p' dihydroxy diphenyl sulphone than was originally present, i. e. more than about 30%, it must be treated in a somewhat different manner in order to separate the remaining constituents. If additional calcium oxide or hydroxide is added to the solution in an amount sufficient to provide an equimolar amount based on the sulphones remaining in the solution or up to 40% in excess of that amount, and the solution is simultaneously heated at 70 to 100° C., a precipitate ultimately forms which is a calcium complex of o,p' dihydroxy diphenyl sulphone. After separating this calcium complex from the solution, as by filtering, it is converted to o,p' dihydroxy diphenyl sulphone by forming a slurry with water and acidifying the slurry with hydrochloric acid or other acid capable of forming a water soluble calcium salt. The resulting o,p' dihydroxy diphenyl sulphone, which constitutes most of the o,p' sulphone present in the original mixture, is then removed from the slurry by filtering or any other suitable means.

The filtrate or solution remaining after the separation of the calcium complex of o,p' dihydroxy diphenyl sulphone may be further treated to separate most of the remaining p,p' dihydroxy diphenyl sulphone from the resinous material originally present in the sulphone mixture. This may be accomplished by acidifying the solution to a pH preferably not below about 6.8 in order to avoid coprecipitation of excessive amounts of resin. As a result of such treatment, a precipitate forms consisting essentially of the p,p' dihydroxy diphenyl sulphone which was not removed during the initial treatment of the sulphone mixture. This precipitate may be removed by filtering or the like. The filtrate remaining contains resinous material and small amounts of p,p' and o,p' dihydroxy diphenyl sulphones, which may be precipitated by acidifying to a pH of 1 to 4.

The p,p' dihydroxy diphenyl sulphone first precipitated from solution is in a substantially pure condition, but the p,p' dihydroxy diphenyl sulphone obtained by acidifying the solution left after removal of the o,p' dihydroxy diphenyl sulphone is mixed with small amounts of residual o,p' dihydroxy diphenyl sulphone. By recycling, however, this relatively crude p,p' sulphone may be obtained in a substantially pure condition. For example, the crude p,p' dihydroxy diphenyl sulphone may be subjected to the same general treatment as the original sulfone mixture, that is, the crude sulphone may be dissolved in water by means of CaO or Ca(OH)₂ at temperatures of 50 to 100° C. and thereafter precipitated by cooling to form a calcium complex from which substantially pure p,p' dihydroxy diphenyl sulphone may be obtained as hereinbefore described. If desired also, the solution remaining after this purifying treatment may be further treated in accordance with one or more of the subsequent steps of the process previously described.

A further understanding of the invention will be obtained from the following example, which represents a preferred method of carrying out the invention:

Six hundred grams of a crude mixture of isomeric dihydroxy diphenyl sulphones containing about 75% of p,p' dihydroxy diphenyl sulphone, 20% o,p' dihydroxy diphenyl sulphone and 5% of resinous material, which mixture was obtained by reacting two mols of phenol with one mol of sulphuric acid at elevated temperatures, were stirred in 2600 cubic centimeters of water while heating to 70° C. Seventy-five grams of 95% Ca(OH)₂, which had been previously slurried in 200 cubic centimeters of water, were then added, after which the mixture was heated at 70° C. for about 15 minutes, at the end of which time all of the sulphones and the Ca(OH)₂ had dissolved. The solution was then cooled to about 30° C., which resulted in the precipitation of a calcium complex of p,p' dihydroxy diphenyl sulphone containing one atomic weight of calcium to 4 mols of the sulphone. The precipitate was then filtered off from the solution, after which it was stirred in fresh water, heated to 70° C. and acidified with hydrochloric acid until it reacted acid to Congo paper, at which point all of p,p' dihydroxy diphenyl sulphone was set free from the calcium complex. The p,p' dihydroxy diphenyl sulphone was then removed from the solution by filtering. It was obtained in the amount of 245 grams and melted at 238 to 243° C.

The filtrate remaining after removal of the calcium complex of p,p' dihydroxy diphenyl sulphone contained about 355 grams of sulphones and resin, and 57.5 grams of Ca(OH)₂. Upon adding to the filtrate a slurry of 77 grams of 95% Ca(OH)₂ in 220 cubic centimeters of water, while heating to 70° C., a solution was obtained containing 134 grams of 95% Ca(OH)₂, which constitutes an excess of about 20% of the theoretical amount required. When the temperature was raised to 75° C., a precipitate began to appear, which consisted of a calcium complex of o,p' dihydroxy diphenyl sulphone mixed with some of the excess Ca(OH)₂. This calcium complex contained about one atomic weight of calcium for each mol of the sulphone. On further heating for 25 minutes, the temperature rose to 95° C., after which the precipitate was filtered off. The filtered material was then mixed with fresh water, heated to 70° C. and acidified with hydrochloric acid to a pH of 1.4. As a result of this treatment, all of the o,p' dihydroxy diphenyl sulphone was set free from the calcium complex. The dry weight of the sulphone obtained in this manner was 140.9 grams, and it melted at 170 to 180° C.

The filtrate remaining after removal of the calcium complex of o,p' dihydroxy diphenyl sulphone was heated to 70° C., and acidified with HCl to a pH of 6.8 to 7.0 (at 70° C.). On cooling to about 30° C., a precipitate of crude p,p' dihydroxy diphenyl sulphone was obtained, which melted at 215 to 235° C. and was contaminated with a small quantity of colored resinous material. After filtering, the weight of the dry sulphone was 166 grams. Acidification of the resulting filtrate to a pH of 1.75 produced 21 grams of a mixture containing most of the resinous material and small amounts of p,p' and o,p' dihydroxy diphenyl sulphones.

In the above example, the crude sulphone mixture to be purified was dissolved in sufficient water to provide a solution of about 17% sulphone concentration. In the case of mixtures containing a higher percentage of the p,p' dihydroxy diphenyl sulphone, however, a more dilute solution must be provided, down to about 10% in the case of pure p,p' sulphone. The concentration of the solution should be higher, on the other hand, when larger amounts of resinous material are present, but it is not necessary that the solution contain more than about 30% sulphones. In general, as the percentage of resin increases, the amount of p,p' sulphone obtained as a calcium complex decreases. When the resin in the sulphone mixture is as high as 10% of the weight of the mixture, no precipitate in the form of a calcium complex can be obtained at any concentration of the solution. Thus, nothing is to be gained by increasing the concentration of the solution beyond a certain point, usually about 30% sulphones.

In the example, about 40% of an equimolar amount of Ca(OH)₂ based on the amount of the sulphone mixture was used to precipitate the calcium complex of the p, p' sulphone. This equimolar percentage may be reduced to as low as 30%, but in such case, the solution tends to be more difficult to handle. If the equimolar percentage is increased to 50%, the recovery of the calcium complex of the p, p' sulphone is reduced somewhat. Thus, it is preferable to employ about 40% of an equimolar amount of the Ca(OH)₂, although the process is workable for most practical purposes within the range of 30 to 50%.

In the second step of the above example, the filtrate remaining after the separation of the calcium complex of p,p' sulphone was treated with an excess of Ca(OH)₂ to precipitate a calcium complex of the o,p' sulphone. Because of the fact that some of the p,p' sulphone was removed during the first step, the concentration of the sulphones in the solution at this point is around 10%, under which circumstance substantially no p,p' dihydroxy diphenyl sulphone is precipitated. Although the theoretical amount of Ca(OH)$_2$ may be used, that is one mol of Ca(OH)$_2$ for each mol of sulphone, the precipitation of the calcium complex of o,p' dihydroxy diphenyl sulphone is accelerated appreciably by the use of more than the theoretical amount of Ca(OH)$_2$ or CaO.

Although it is possible to use temperatures within the range of 50 to 100° C. during the formation of the initial solution, it is usually preferable to use temperatures between 70 and 80° C. Likewise, it is possible to use temperatures between 70 and 100° C. to cause the precipitation of a calcium complex of o,p' dihydroxy diphenyl sulphone, but it is preferable to employ temperatures between 80 and 95° C.

While the general principles of the separation and purification procedure described above can be applied to any mixture of o,p' and p,p' dihydroxy diphenyl sulphones, the method must be varied somewhat when treating mixtures containing more than about 30% of o,p' dihydroxy diphenyl sulphone. For example, if a mixture containing a high percentage (more than 30%) of the o,p' dihydroxy diphenyl sulphone is to be separated into its component isomers, the o,p' isomer should be removed first, and for this purpose the concentration of total sulphones in the limed solution should not exceed about 12% and preferably should be no higher than about 10%. Theoretical lime or excess of lime is added at the start to remove the calcium complex of o,p' sulphone. Under these circumstances, if a solution containing more than about 12% sulphones is formed, a calcium complex of the p,p' sulphone is precipitated along with the calcium complex of the o,p' sulphone when the solution is heated at a temperature between 70 and 100° C., thereby defeating the purpose of the treatment. Thus, in separating and purifying mixtures containing more than 30% of o,p' sulphone, it is essential that the solution formed be no higher than about 12% concentration and that it be heated at a temperature between 70 and 100° C. if a calcium complex of the o,p' sulphone is to be obtained which is substantially free of the calcium complex of the p,p' sulphone.

The exact nature of the calcium complexes referred to herein is not known. However, regardless of the chemical nature of the precipitates formed, the separation of the various isomers in the mixtures treated and the purification of certain of the isomers can be readily accomplished as described and hereinafter claimed.

What I claim is:

1. The method of separating p,p' dihydroxy diphenyl sulphone from mixtures containing p,p' dihydroxy diphenyl sulphone and no more than about 30% of o,p' dihydroxy diphenyl sulphone which comprises forming a water solution of said mixture by mixing said mixture of isomeric sulphones with from 30 to 50% of an equimolar amount of a substance selected from the group consisting of calcium oxide and calcium hydroxide and an amount of water sufficient to provide a solution containing about 10 to 30% sulphones and heating at a temperature varying from 50 to 100° C.; cooling the resulting solution until a precipitate of a calcium complex of p,p' dihydroxy diphenyl sulphone is formed, separating said precipitate from the solution, and converting said calcium complex to p,p' dihydroxy diphenyl sulphone by forming a slurry with water and acidifying with an acid capable of forming a water soluble calcium salt, and separating the p,p' dihydroxy diphenyl sulphone from said slurry.

2. The method of separating p,p' dihydroxy diphenyl sulphone and o,p' dihydroxy diphenyl sulphone from mixtures containing p,p' dihydroxy diphenyl sulphone and no more than about 30% of o,p' dihydroxy diphenyl sulphone which comprises forming a water solution of said mixture by mixing said mixture of isomeric sulphones with from 30 to 50% of an equimolar amount of a substance selected from the group consisting of calcium oxide and calcium hydroxide and an amount of water sufficient to provide a solution containing about 10 to 30% sulphones and heating at a temperature varying from 50 to 100° C.; cooling the resulting solution until a precipitate of a calcium complex of p,p' dihydroxy diphenyl sulphone is formed, separating said precipitate from the solution, and converting said calcium complex to p,p' dihydroxy diphenyl sulphone by forming a slurry with water and acidifying with an acid capable of forming a water soluble calcium salt, separating the p,p' dihydroxy diphenyl sulphone from said slurry, adding a substance selected from the group consisting of calcium oxide and calcium hydroxide to said solution in an amount sufficient to provide from 100 to 140% of an equimolar amount based on the amount of sulphones remaining in said solution and heating the solution at 70 to 100° C. until a precipitate of a calcium complex of o,p' dihydroxy diphenyl sulphone is formed, separating said last mentioned calcium complex from the solution, and converting said last mentioned calcium complex to o,p' dihydroxy diphenyl sulphone by forming a slurry with water and acidifying said slurry with an acid capable of forming a water soluble calcium salt, and separating the o,p' dihydroxy diphenyl sulphone from said slurry.

3. The method of separating p,p' dihydroxy diphenyl sulphone and o,p' dihydroxy diphenyl sulphone from mixtures containing p,p' dihydroxy diphenyl sulphone and no more than about 30% of o,p' dihydroxy diphenyl sulphone which comprises forming a water solution of said mixture by mixing said mixture of isomeric sulphones with from 30 to 50% of an equimolar amount of a substance selected from the group consisting of calcium oxide and calcium hydroxide and an amount of water sufficient to provide a solution containing about 10 to 30% sulphones and heating at a temperature varying from 50 to 100° C.; cooling the resulting solution until a precipitate of a calcium complex of p,p' dihydroxy diphenyl sulphone is formed, separating said precipitate from the solution, and converting said calcium complex to p,p' dihydroxy diphenyl sulphone by forming a slurry with water and acidifying with an acid capable of forming a water soluble calcium salt, separating the p,p' dihydroxy diphenyl sulphone from said slurry, adding a substance selected from the group consisting of calcium oxide and calcium hydroxide to said solution in an amount sufficient to provide from 100 to 140% of an equimolar amount based on the amount of sulphones remaining in said solution and heating the solution at 70 to 100° C. until a precipitate of a calcium complex of o,p' dihydroxy diphenyl sulphone is formed, separating said last mentioned calcium complex from the solution, and converting said last mentioned calcium complex to o,p' dihydroxy diphenyl sulphone by forming a slurry with water and acidifying said slurry with an acid capable of forming a water soluble calcium salt, and separating the o,p' dihydroxy diphenyl sulphone from said slurry, acidifying said solution to a pH not lower than about 6.8 with an acid capable of forming a water soluble calcium salt thereby forming a second precipitate of p,p' dihydroxy diphenyl sulphone, separating said second precipitate of p,p' dihydroxy diphenyl sulphone from the solution.

4. The method substantially as described in claim 3, but further characterized in that the second precipitate of p,p' dihydroxy diphenyl sulphone is recycled.

5. The method substantially as described in claim 3, but further characterized in that the second precipitate of p,p' dihydroxy diphenyl sulphone is purified by mixing it with from 30 to 50% of an equimolar amount of a substance selected from the group consisting of calcium oxide and calcium hydroxide and an amount of water sufficient to provide a solution containing about 10 to 30% sulphones and heating the mixture at a temperature varying from 50 to 100° C., whereby said second precipitate is dissolved, then cooling the resulting solution until a precipitate of a calcium complex of p,p' dihydroxy diphenyl sulphone is formed, separating said precipitate from the solution, and converting said calcium complex to p,p' dihydroxy diphenyl sulphone by forming a slurry with water and acidifying with an acid capable of forming a water soluble calcium salt, and separating the p,p' dihydroxy diphenyl sulphone from said slurry.

6. The method of separating p,p' dihydroxy diphenyl sulphone from mixtures containing p,p' dihydroxy diphenyl sulphone and no more than about 30% of o,p' dihydroxy diphenyl sulphone which comprises forming a water solution of said mixture by mixing said mixture of isomeric sulphones with about 40% of an equimolar amount of calcium hydroxide and an amount of water sufficient to provide a solution containing about 10 to 30% sulphones and heating at a temperature varying from 70 to 80° C., cooling the resulting solution until a precipitate of a calcium complex of p,p' dihydroxy diphenyl sulphone is formed, separating the precipitate from the solution, and converting said calcium complex to p,p' dihydroxy diphenyl sulphone by forming a slurry with water and acidifying with hydrochloric acid, and separating the p,p' dihydroxy diphenyl sulphone from said slurry.

7. The method of separating p,p' dihydroxy diphenyl sulphone and o,p' dihydroxy diphenyl sulphone from mixtures containing p,p' dihydroxy diphenyl sulphone and no more than about 30% of o,p' dihydroxy diphenyl sulphone which comprises forming a water solution of said mixture by mixing said mixture of isomeric sulphones with about 40% of an equimolar amount of calcium hydroxide and an amount of water sufficient to provide a solution containing about 10 to 30% sulphones and heating at a temperature varying from 70 to 80° C., cooling the resulting solution until a precipitate of a calcium complex of p,p' dihydroxy diphenyl sulphone is formed, separating said precipitate from the solution, and converting said calcium complex to p,p' dihydroxy diphenyl sulphone by forming a slurry with water and acidifying with hydrochloric acid, separating the p,p' dihydroxy diphenyl sulphone from said slurry, adding calcium hydroxide to said solution in an amount sufficient to provide an excess over an equimolar amount based on the amount of sulphones remaining in said solution and heating the solution at 80 to 95° C. until a precipitate of a calcium complex of o,p' dihydroxy diphenyl sulphone is formed, separating said last mentioned calcium complex from the solution, and converting said last mentioned calcium complex to o,p' dihydroxy diphenyl sulphone by forming a slurry with water and acidifying said slurry with hydrochloric acid, and separating the o,p' dihydroxy diphenyl sulphone from said slurry.

8. The method of separating o,p dihydroxy diphenyl sulphone from mixtures containing p,p' dihydroxy diphenyl sulphone and more than about 30% of o,p' dihydroxy diphenyl sulphone which comprises forming a water solution of said mixture by mixing said mixture of isomeric sulphones with from 100 to 140% of an equimolar amount of a substance selected from the group consisting of calcium oxide and calcium hydroxide and an amount of water sufficient to provide a solution containing no more than about 12% sulphones and heating at a temperature varying from 50 to 100° C.; continuing the heating at a temperature between 70 and 100° C. until a precipitate of a calcium complex of o,p' dihydroxy diphenyl sulphone is formed, separating said calcium complex from the solution, and converting the calcium complex to o,p' dihydroxy diphenyl sulphone by forming a slurry with water and acidifying said slurry with an acid capable of forming a water soluble calcium salt, and separating the o,p' dihydroxy diphenyl sulphone from said slurry.

9. The method of separating o,p' dihydroxy diphenyl sulphone and p,p' dihydroxy diphenyl sulphone from mixtures containing p,p' dihydroxy diphenyl sulphone and more than about 30% of o,p' dihydroxy diphenyl sulphone which comprises forming a water solution of said mixture by mixing said mixture of isomeric sulphones with from 100 to 140% of an equimolar amount of a substance selected from the group consisting of calcium oxide and calcium hydroxide and an amount of water sufficient to provide a solution containing no more than about 12% sulphones and heating at a temperature varying from 50 to 100° C.; continuing the heating at a temperature between 70 and 100° C. until a precipitate of a calcium complex of o,p' dihydroxy diphenyl sulphone is formed, separating said calcium complex from the solution, and converting the calcium complex to o,p' dihydroxy diphenyl sulphone by forming a slurry with water and acidifying said slurry with an acid capable of forming a water soluble calcium salt, and separating the o,p' dihydroxy diphenyl sulphone from said slurry, acidifying said solution with an acid capable of forming a water soluble calcium salt, and separating the remaining sulphones consisting primarily of p,p' dihydroxy diphenyl sulphone from the solution.

SCOTT H. FOSTER.